May 3, 1927.
W. H. PRITCHETT
AUTOMOBILE CURTAIN
Filed Aug. 3, 1925 3 Sheets-Sheet 1
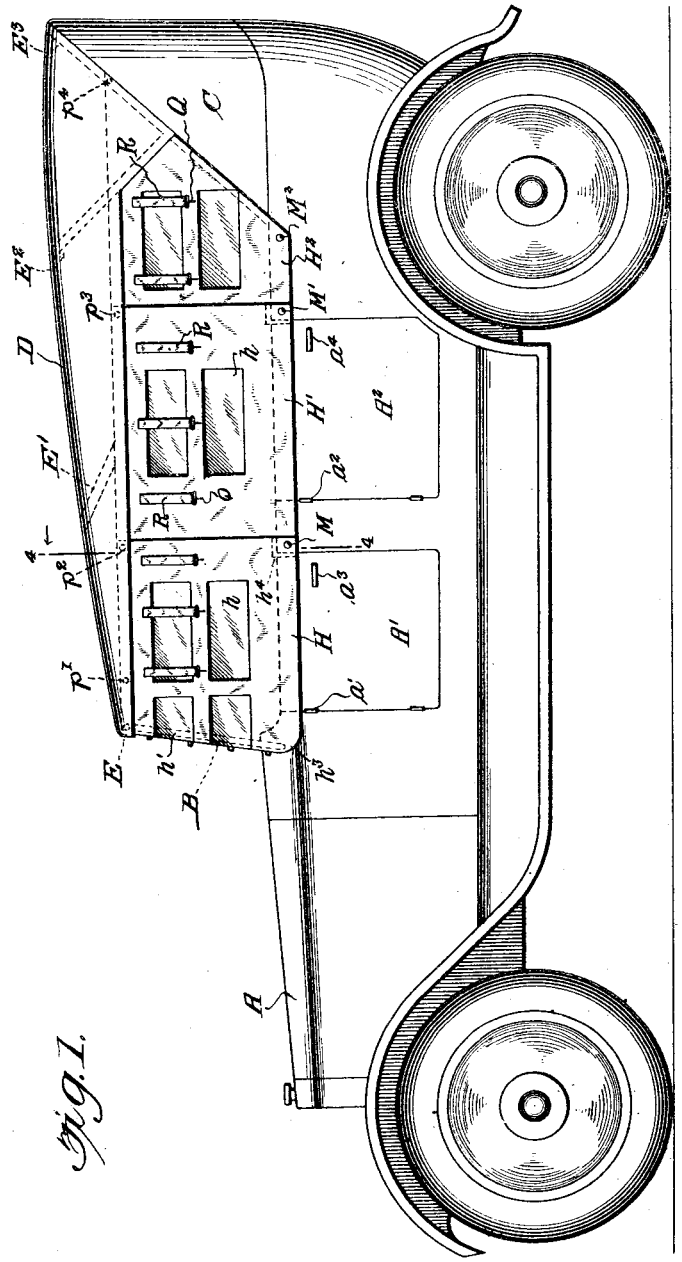
Inventor
W.H.Pritchett,
By Wilkinson & Giusta
Attorneys.

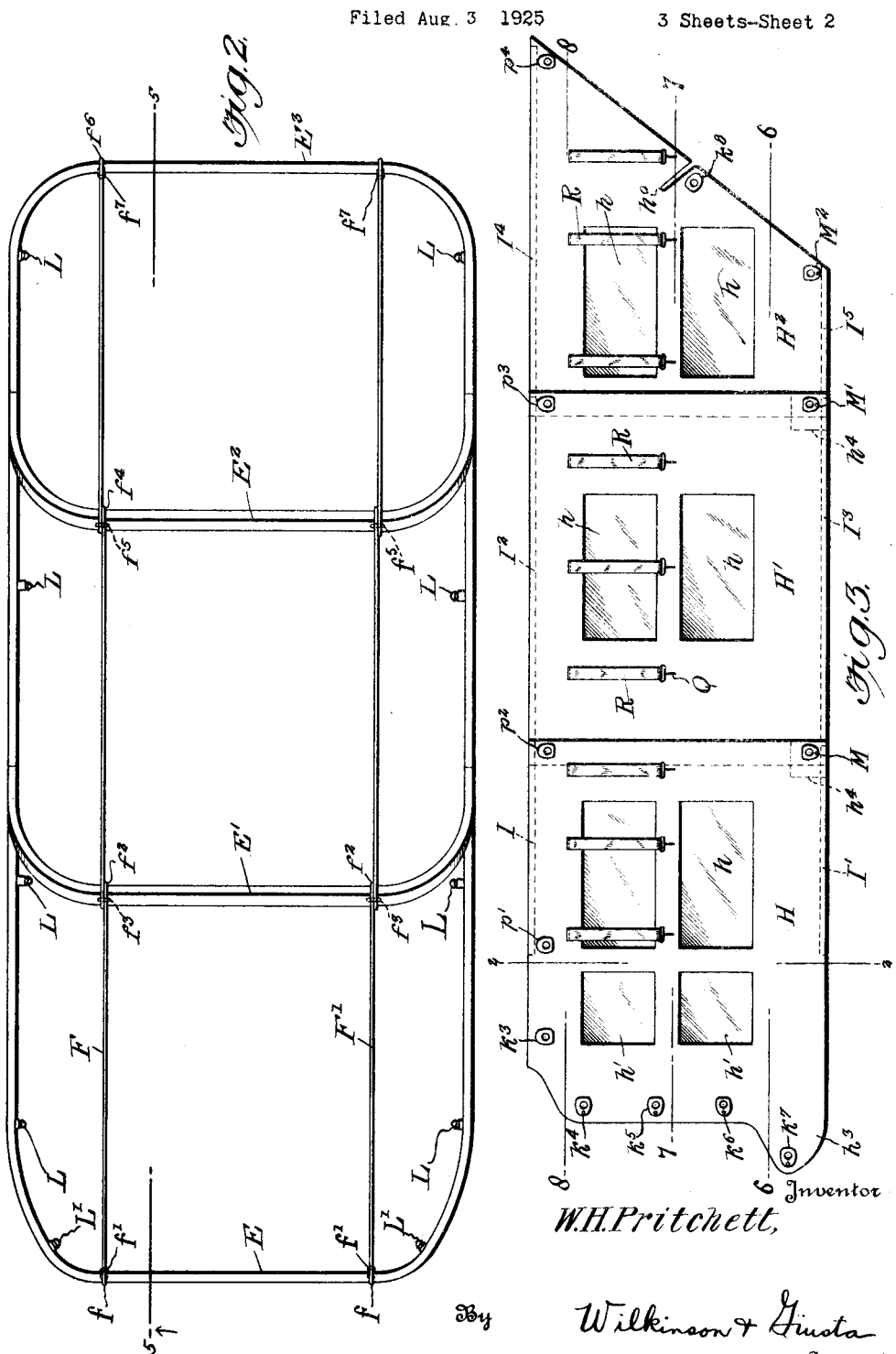

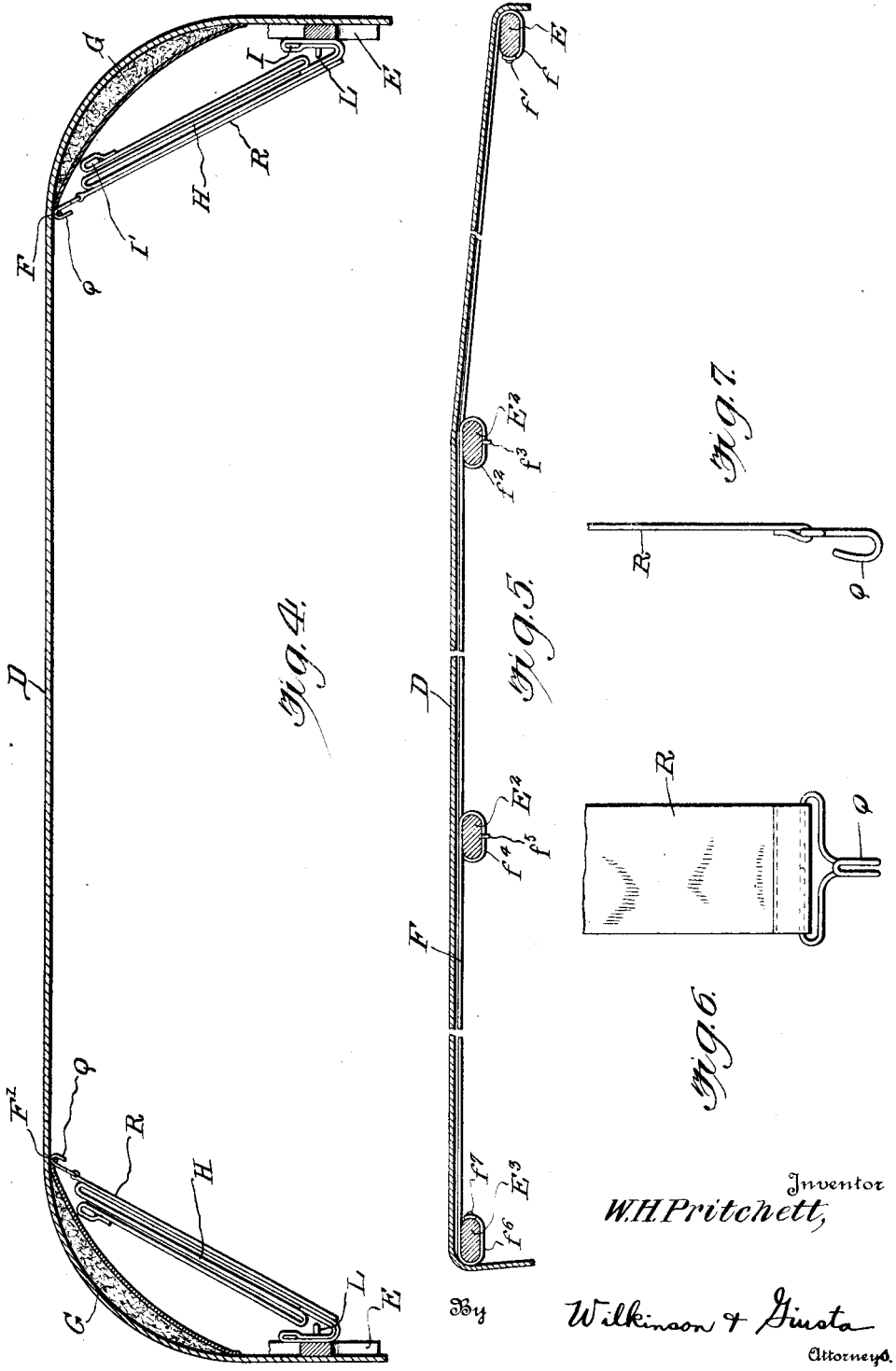

Patented May 3, 1927.

1,627,457

UNITED STATES PATENT OFFICE.

WILLIAM H. PRITCHETT, OF SAN DIEGO, CALIFORNIA.

AUTOMOBILE CURTAIN.

Application filed August 3, 1925. Serial No. 47,947.

My present invention relates to improvements in automobile curtain arrangements intended for use more particularly with cars of standard type known as touring cars and more especially with the very large number of such cars of the cheaper make, such as Fords, Dodges, or the like.

The tendency to standardization observable in most of the larger industries has not always been followed with regard to the application and use of the curtains for automobiles, and some of the curtains now sold apparently require that the car should be built to fit the curtain rather than that the curtain should be made to fit the car.

Most touring cars are substantially similar in general characteristics, in that they are provided with certain arrangements of swinging bows for the tops and certain attachments are herein provided to be applied to these swinging bows or other parts of the automobile of standard type, to permit the quick application to, and removal of, my improved automobile curtains, as will be hereinafter described.

With most of the arrangements now in use, the curtains, when not in use, are folded up and stored away under the seat in such a way that they are soon worn out or broken or otherwise injured, and when it is desired to use same, it is necessary to break out the curtains, get on the outside of the car, frequently in the rain, and apply same.

Moreover, curtains are frequently so mounted as to render it difficult for the chauffeur to make the usual hand signals. Moreover, with the curtain securely fastened in the usual way, it is in some cases difficult and sometimes dangerous, for the occupants of the car, in case a speedy exit from the car becomes necessary, as in case of accident, or more especially getting into deep water.

My invention is primarily intended to provide a system of curtains, comprising the following advantages:

First: It provides a secure position in which to store the curtains, when not in use, without detaching the curtains from the automobile. This storage position is such that the curtains may be easily and quickly lowered from such position into the position for protecting the occupants of the car from wind and rain. With my system of curtains this operation may be performed in a few seconds by the occupants of the car without leaving the seats.

Second: This system of curtains is much more simple in construction than the system or systems now in general use. This system of curtains can therefore be manufactured much more cheaply.

Third: This system eliminates the necessity of manufacture of upright rods now used, in the system of curtains now in vogue, for supporting that portion of the curtain which "opens with the door". These upright rods are difficult and expensive to manufacture, as each door requires a rod especially shaped and properly bent for that particular door. The rods are not interchangeable and being quite similar in appearance are very confusing and annoying to the motorist who has occasion to put up his curtains in a hurry. Also, special and expensive sockets must be provided in each door for the upright rod of that door.

Fourth: The folded and secured position of the curtains is an excellent position for permanent storage of the curtains when not in use. At the same time, the curtains are in position to be instantly put in use without the necessity of getting them out from under the seat, or out of the curtain pocket, as is necessary with the systems now in use.

Fifth: In this system, the curtains hang, and always remain, in a smooth and even position, thus presenting a neat and tidy appearance which is far superior to the uneven, bedraggled, and ragged appearance assumed after short usage by the average curtain now in use on open automobiles.

Sixth: This system of curtains can be lowered and snapped in position without the necessity of removing the side wings, now commonly used, which are clamped to the uprights on both sides of the windshield. In all cars, which are not furnished with side wings by the manufacturers, the side wings must be removed before the forward curtains furnished with the car can be put up.

Seventh: Two wires are the only installation necessary to install this system of curtains on any touring automobile regardless of make. The posts already installed in all makes of cars, for the purpose of supporting the curtains, may be used for this system. The excess of posts may be removed, and the position of one or two posts only, on some cars, would have to be changed.

Eighth: The curtain rods which are provided for both upper and lower edges of all curtains of this system, cause those edges of the curtains to lie smoothly and snugly against the surfaces to which they are attached. The upper rods also lessen the number of supporting fasteners which would otherwise be required.

These and other advantages of my invention will be more fully understood after reference to the accompanying drawings, in which like parts are indicated by similar reference symbols throughout the several views, and in which:

Fig. 1 shows a side elevation of a touring car of standard make, with my system of curtains applied thereto and in the lowered and secured position;

Fig. 2 is a diagrammatic view showing the bows of the touring car with the wires secured thereto, the bows being in the normal position when the top is up;

Fig. 3 is an exterior view on a larger scale of the three curtains used on each side of the car, but detached from the car, and laid out with the parts overlapping;

Fig. 4 shows a transverse section through the roof of the car and illustrates the manner in which the curtains are folded up into the stored position and out of the way. This view shows diagrammatically a section along the line 4—4 of Fig. 1, and looking in the direction of the arrows;

Fig. 5 shows a longitudinal section along the line 5—5 of Fig. 2, and looking in the direction of the arrows, and illustrates one mode of attaching the wire to the bows.

Parts of the automobile frame are omitted for the sake of clearness in the drawings.

Figs. 6 and 7 are detail views showing in front and side elevation the hooks and straps for holding the curtains in place, when not in use;

In the drawings the curtains on one side of the car only are shown in detail, as those on the other side of the car would be substantially identical, except that the curtains would be made rights and lefts in the usual well known way.

A represents the automobile body of an ordinary touring car provided with the usual front doors A' and rear doors A², which are hinged as at a' and a², and are provided with the usual handles a³ and a⁴. The top D of the automobile extends between the windshield frame B and the rear portion C of the automobile, which parts B and C are of the usual or any preferred form and will not be further described.

The top D is preferably of standard construction, provided with the usual bows E, E', E² and E³ shown diagrammatically in plan in Fig. 2, which bows are connected to the automobile in the usual way and permit the top to be raised or lowered, as is well known in the art.

Connecting these bows are the wires F and F', which are ordinarily the only additional features required by my system in applying the system of curtains to automobiles of well known makes. These wires may be connected to the bows in any convenient way, such for instance, as shown in detail in Fig. 5, where one of the wires F has its end f fastened to the front bow E as at f', and passing over this bow is looped around the second bow E' as at f² and may be secured in place as by a staple f³. In a similar way, the wires loop around the third bow E² as at f⁴ and is held in place by the staple f⁵, and finally the rear end is passed around the rear bow E³ as at f⁶ and is secured thereto by the staple f⁷. One or more turns of the wire may be made around the bow or the wire may be otherwise fastened to the bow, if desired.

The automobile top may be provided with the usual pads G, at the upper bends thereof as shown in Fig. 4, and beneath these pads the curtains are folded up and held in place when not in use, as shown in Fig. 4. There are two sets of curtains, one for each side of the car, one set only, that for the left hand side of the car looking forward, of which is shown in Figs. 1 and 3, the curtains on the opposite side being practically the same, but with the parts reversed, of course.

For any ordinary touring car, the curtain arrangement for each side of the car consists of three separate curtains, the front curtains H, the center curtains H', and the rear curtains H². These curtains may be provided with illuminating panes, made of celluloid, mica, or plate glass, if desired, such as h and h', which panes are spaced apart so as to permit the curtains to be folded between the same, along the lines 2—2, 6—6, 7—7, and 8—8.

Each front curtain H is shown as provided with curtain rods I and I' at the top and bottom, see Fig. 3, which curtain rods extend only part of the length of the curtain, so as to permit the curtain to be folded inward and back upon itself the fold being made along the line 2—2. The absence of curtain rods forward of the line 2—2 enables the forward portion of the curtain H to take the rounding corner of the forward end of the top of the usual touring car. The front curtain is of irregular shape, having the forward projection h² to go around the front of the car as will be hereinafter described.

The center curtain H' is preferably rectangular in shape and is provided with top and bottom rods I² and I³; the former extending the full length of the curtain while the latter is about 2 inches shorter than the curtain. The rear curtain H² is shown as trapezoidal having the top and bottom curtain rods I⁴ and I⁵; the former extending the full length of the curtain top, while the latter is 2 inches shorter than the lower edge of the curtain as shown in Fig. 3. All curtain rods are preferably made of band iron or steel, of substantially rectangular cross section, and more or less flat. The upper curtain rods of the center and rear curtains, H′ and H² of Fig. 3, extend the full length of the upper edges of those curtains. These rods serve the purpose of holding the curtain rigid and smooth throughout its length and reduce the number of supporting fasteners, necessary to hold the curtain in place, to two, one fastener being placed under each end of each upper curtain rod.

The lower curtain rods I³ and I⁵ of the center and rear curtains H′ and H², Fig. 3, terminate about 2 inches in rear of the front edges of those curtains respectively. This in order that the lower curtain rod of the curtain next in front, in each case, shall not overlap the curtain rod of the curtain next in rear but will form one continuous and smooth line on the side of the car, when the curtains are fastened in the lowered position, as shown in Fig. 1. All curtain rods are permanently sewed into hems on the edges of the curtains.

The rear edge of the forward curtain H, Fig. 3, is secured on the same fastening posts at $p^2$ and M, as the forward edge of the center curtain H′ which it overlaps. Similarly, the rear edge of the center curtain H′ is secured on the same fastening posts at $p^3$ and M′ as the forward edge of the rear curtain H² which it overlaps.

Each curtain is provided just below the ends of the curtain upper rod with "Lift-the-Dot" fasteners $p'$, $p^2$, $p^3$ and $p^4$ adapted to engage the metallic posts L, see Fig. 4. This fastening arrangement being well known in the art, and now commonly used, will not be further described. The same type of fastener is preferably used throughout my system of curtains.

The front curtain is provided with fasteners $h^4$, $h^5$ and $h^6$ to engage corresponding metallic posts on the framework of the left edge of the windshield and with the fastener $h^7$, adapted to engage a post on the lower edge of the windshield frame while the rear curtain is provided with a similar fastener $h^8$, to fasten the rear edge thereof.

The fastener $h^3$ of the forward curtain H, Fig. 3, engages the post L′, Fig. 2, on the inside of corner curve of top.

It will be noted that the fastener posts at the positions $p^2$, $p^3$, M and M′ will necessarily be of double length in order to accommodate two curtain fasteners on each of these posts. Single length posts may be used in each of these positions, provided another single length post is placed just in rear of each of these positions; in which case, it would be necessary to move the fasteners of the forward edge of center and rear curtains to corresponding positions on these two curtains. The advantage in so doing would be a shorter protruding post on the side of the car at the positions M and M′ Fig. 1, when the curtains are not in use. Also, both lower corners of the center curtain H′ will be automatically released by the outward swing of the door A².

The lower and rear corners of the curtains H and H′ are provided with reinforcing patches $h^4$, as there is contact between the curtains and the upper rear corners of the doors at this point in the operation of opening the doors.

The rear curtain is slotted as at $h^9$ to pass over the hinge between the two rear bows.

Each curtain is provided with supporting straps R having one end sewed to the curtain and the free end provided with a hook Q adapted to pass over one of the wires F or F′. The three curtains overlap from front to rear, as shown in Figs. 1 and 3.

When not in use, the curtains are folded up out of the way, as shown in Fig. 4, where the hook Q is shown as engaging the wire F. In this position all of the curtains are neatly folded inside of the top of the car and lie smoothly and snugly just under the pads G on both sides of the car. In this position, the curtains are invisible to a person standing outside of the car. Each curtain is securely held in this position by its straps R, Fig. 4. In this position, the curtains present a smooth neat appearance and are entirely out of the way of the occupants of the car. There is also no pressure or friction which would tend to break or wear the parts or injure the panes regardless of the material used in manufacture.

From the folded and secured position shown in Fig. 4, the operation of lowering the curtains to the position shown in Fig. 1 is as follows:

Beginning with the forward curtain, the driver releases the hooks Q of the straps R of this curtain, allowing the curtain to fall to the vertical position. He then unfolds forward that portion of the curtain forward of the line 2—2 Fig. 3. He now secures the fastener $h^3$ Fig. 3, on the fastener post L′ Fig. 2. He then extends his left hand under the curtain and around the left side of the windshield and secures the fasteners $h^4$, $h^5$, $h^6$ and $h^7$ in the order named, to their respective posts. He then releases the hooks Q of the center curtain H′, Fig. 3, allowing that curtain to fall to the vertical position. He now secures the fastener of the lower forward corner of the center curtain onto the double length post at M Fig. 3, pushing the fastener well down on the post. He now extends his hand between the overlapping edges of the forward and center curtains H and H′, Fig. 3, and secures the fastener of the lower rear corner of the forward curtain onto the same double length post with, but on top of, the fastener of the lower forward corner of the center curtain H′. The hooks Q of the rear curtain H² are now similarly released by the occupant of the rear seat. The curtain falls into the vertical position and the fasteners of the lower edge are secured over their respective posts, the lower forward fastener being pushed well down on the double length post at M′ Fig. 3. The lower rear fastener of the center curtain is now secured on the same double length post by extending the hand between the overlapping portions of the center and rear curtains in the same manner as described for the lower rear fastener of the forward curtain.

The curtains being in the lowered position shown in Fig. 1, the operation of raising the curtains to the folded and secured position shown in Fig. 4 is as follows:

The occupant of the rear seat opens the rear door in the usual manner. This automatically releases the lower rear fastener M′, Fig. 3, of the center curtain, as will be hereinafter more fully explained. The fasteners of the lower edge of the rear curtain are now released by the occupant of the rear seat extending his arm over the rear door and rearward to the fasteners on the outside of the rear curtain. The rear curtain is then folded in three folds from the bottom edge inward and upward, the folds being made on the lines 6—6, 7—7, and 8—8. Fig. 3. The hooks Q of the straps R are now placed over the wire F as shown at the left side of Fig. 4. The front door A′, Fig. 1, is now opened, thus automatically releasing the lower rear fastener of the forward curtain. The lower forward fastener of the center curtain is then released and the center curtain is folded and secured in the same manner as explained for the rear curtain. The driver now extends his left arm under the forward curtain H, Fig. 3, and releases the fasteners k⁷, k⁶, k⁵ and k⁴ in the order named. The fastener k³ is also released. The forward portion of the forward curtain H is now folded inward and rearward on the vertical line 2—2, Fig. 3. The entire curtain is now folded and secured in the same manner as explained for the rear curtain. By providing the wear patches h⁴ as shown, the corner of the curtain is protected against being scarred or worn by the contact between the corner of the door and this portion of the curtain incident to the automatic unfastening of the same when the door is opened.

The "Lift-the-Dot" fasteners of the lower rear corners of the forward and center curtains are placed on these curtains with the "dot" portion of the fasteners adjacent to the lower curtains rods. When the curtains are in the lowered position shown in Fig. 1, the rods in the lower edges of these curtains lie flat against the sides of the doors. The metallic posts on which these fasteners are secured are placed on the body of the car just in rear of the rear edges of the doors A′ and A². Fig. 1. Any outward swing of the doors will therefore push the lower curtain rods outward and upward, thus releasing the fasteners from the fastening posts and thus automatically releasing the lower rear corners of the two curtains with the very slight opening of the doors. The curtain being thus automatically released by the opening of the door, the occupant of either seat of the car may pass out of the car under the curtain, pushing the curtain outward and upward as he passes out.

The outward swing of the doors automatically releases only one of the fasteners on the lower edge of each curtain. Actual experiment proves that this allows the curtain to open sufficiently to allow the occupant to pass out of the car; however, the occupant may pass out with greater facility by extending his, or her, arm under the lower edge of the partially released curtain and releasing the other fastener of the lower edge of the curtain. This will allow the entire curtain to be pushed outward and upward by the occupant in passing out of the car.

When the occupant re-enters the car, the door is swung to in the usual manner and the lower rear corners of the forward and center curtains are secured in the same manner as explained in the operation of lowering the curtains.

It will be seen that I provide an arrangement by which the curtains may be conveniently stored while in transit without liability of injuring the same and may be quickly put in place for protective purposes and quickly returned to the initial position, all without detaching the heads of the curtains from the vehicle. It will also be seen that by the herein described arrangement, the opening of either door of the car will automatically release a lower corner of the adjacent curtain and will permit the free egress of any or all of the occupants of the car. It will be noted that the doors A′ and A² shown in Fig. 1, are both hinged on the forward edge. This is the custom in practically all makes of cars now in use, however, a few cars have the rear doors hinged at the rear edge of the door. My system of curtains is easily adapted to use on an automobile on which the rear doors are hinged on the rear edge. In this case the center curtain would cover only the space between the front door and the rear door. It is only necessary, in all cases, that the curtain covering the door shall have the fastener post of the lower corner of the curtain on the body of the car adjacent to the opening edge of the door.

The snap fasteners used for fastening the curtains will ordinarily be found in use on touring cars of standard make and are commercially known as the "Lift-the-Dot" fastener. The only novel feature that will be necessary to add to the car to carry out my herein described system will be the two overhead wires F and F', which can be readily put in place at any time after the car has been completed or even after it has been delivered to the purchaser.

It will be seen that the curtains are of simple construction and may be made of cheap materials, if so desired, or may be made in a very elaborate way, using plate glass, for the panes, and higher grade materials, but the invention is primarily intended to provide a cheap, efficient, convenient and durable curtain arrangement for low priced cars.

While I have described the preferred embodiment of the invention, it will be obvious that various changes might be made therein, which could be used without departing from the spirit of my invention, and I do not mean to limit my invention to such details except as pointed out in the claims.

Having thus described my invention, what I claim and desire to secure by Letters Patent of the United States is:

1. An automobile curtain arrangement comprising a side curtain suspended from the upper portion of the vehicle and adapted to swing outwards at the bottom, a rod secured along the lower edge of said curtain, and a snap fastener connecting a lower corner of said curtain to the frame of the car adjacent the opening edge of a swinging door, and adapted to be automatically disengaged when the door strikes said rod incident to the operation of opening the door, substantially as described.

2. An automobile curtain arrangement comprising a side curtain suspended from the upper portion of the vehicle and adapted to swing outwards at the bottom, a rod secured along the lower edge of said curtain, and a snap fastener connecting a lower corner of said curtain to the frame of the car adjacent the opening edge of a swinging door, and adapted to be automatically disengaged when the door strikes said rod incident to the operation of opening the door, with a wear patch secured to said curtain in the region engaged by said door in opening, substantially as described.

3. An automobile curtain arrangement comprising a side curtain suspended from the upper portion of the vehicle and opening outwards at the bottom, and a snap fastener connecting a lower edge of said curtain adjacent the opening edge of a swinging door, and adapted to be automatically disengaged incident to the operation of opening the door, with a wear patch secured to said curtain in the region engaged by said door in opening, substantially as described.

WILLIAM H. PRITCHETT.